Jan. 31, 1961 P. T. FELTS 2,969,592
HAIRLINE CUTTER
Filed March 23, 1959
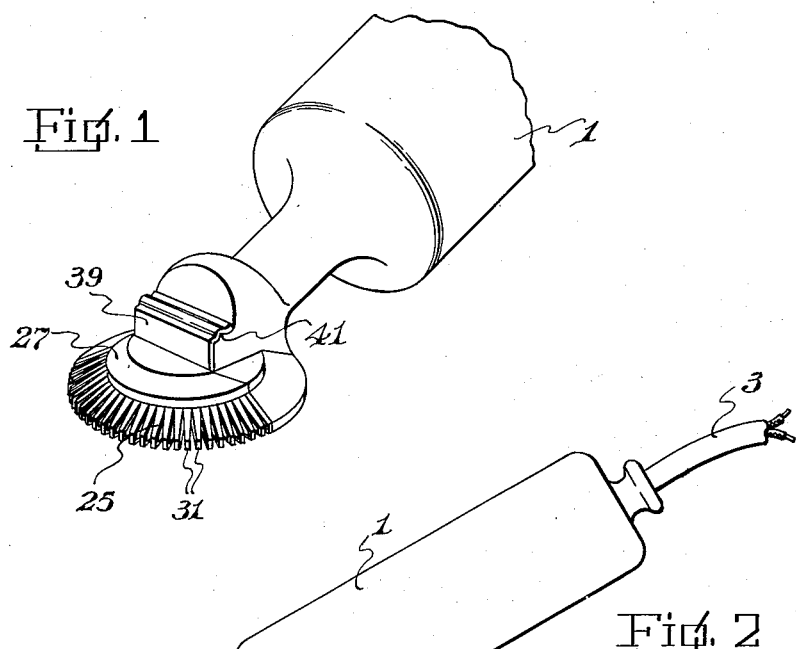
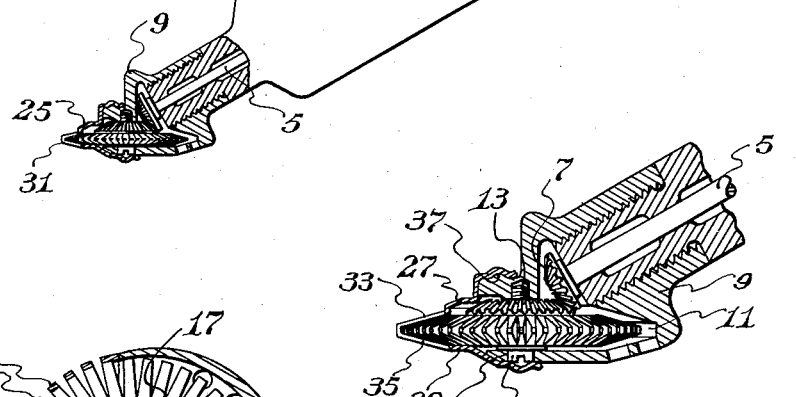
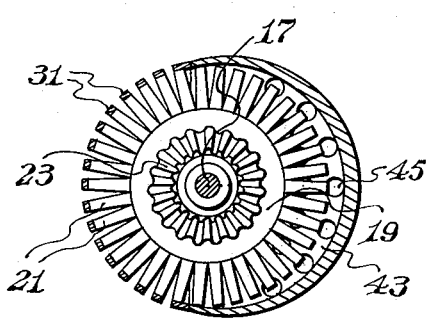
Philip T. Felts
INVENTOR.
BY Robert J. Patin
ATTY

United States Patent Office 2,969,592
Patented Jan. 31, 1961

2,969,592

HAIRLINE CUTTER

Philip T. Felts, 1120 S. Memorial Blvd., Tulsa, Okla.

Filed Mar. 23, 1959, Ser. No. 801,081

2 Claims. (Cl. 30—206)

The present invention relates to a hairline cutter, and more particularly to a device for closely and accurately shaping or trimming the hairline, as for example after a haircut.

An object of the present invention is the provision of a device for shaping the hairline without the need for lathering and shaving.

Another object of the present invention is the provision of a device for quickly and accurately shaping the hairline in regions where the hairline is hard to reach or the contour of the hairline is hard to follow.

Finally, it is an object of the present invention to provide a hairline cutter which is simple and inexpensive to manufacture, easy to operate, clean and repair, and rugged and durable in use.

Other objects and advantages of the present invention will become apparent from a consideration of the following description, taken in connection with the accompanying drawing, in which:

Figure 1 is an enlarged fragmentary perspective view of a portion of a device according to the present invention;

Figure 2 is an elevational view, partly in section, of a device according to the present invention;

Figure 3 is an enlarged fragment of Figure 2; and

Figure 4 is an enlarged plan view, partly in section, of the cutter head assembly of the present invention.

Referring now to the drawing in greater detail, there is shown a hairline cutter comprising a casing including a body portion 1 which provides a handle for the device. Disposed within body portion 1 is a small electric motor (not shown) of conventional construction, which is adapted to be placed in electrical circuit with a source of electric power (not shown) by means of an electric cord 3. Mounted for rotation in the casing and connected with the motor to be driven thereby is a drive shaft 5 which terminates at one end in a drive bevel gear 7 coaxial with shaft 5.

The casing includes a gear housing 9 detachably screw-threadedly mounted on the forward end of housing 1. Housing 9 is essentially hollow and has an internal cavity 11 in which drive gear 7 is disposed. Cavity 11 opens through housing 9 in an elongated slot on the forward side of housing 9. A pair of coaxial recesses 13 and 15 is provided in housing 9, and the common axis of these recesses passes through the axis of drive shaft 5, the two axes forming an acute and an obtuse angle with each other. Recess 13 opens into cavity 11 but does not extend all the way through housing 9. Recess 15 also opens into cavity 11 but extends all the way through housing 9. A headed, screw-threaded rotor shaft 17 extends through recess 15 across cavity 11 and terminates in screw-threaded engagement in recess 13. The head of shaft 17 is provided with a slot for the reception of the point of a screw driver so that shaft 17 may be screwed into the assembled relationship shown in Figure 3 and will thereafter remain stationary relative to housing 9 in the illustrated embodiment. In that assembled relationship, the head of shaft 17 is substantially flush with the outer surface of housing 9.

Mounted in housing 9 on shaft 17 for rotation about the axis of shaft 17 is a rotor 19. In the illustrated embodiment, rotor 19 rotates relative to shaft 17; but it will of course be understood that it is optional whether or not shaft 17 rotates with rotor 19. Rotor 19 includes a plurality of cutting teeth 21 that extend radially outwardly relative to the axis of shaft 17. Thus, the structure described immediately above provides a flat cutting disc disposed in a plane perpendicular to its plane of rotation and having a plurality of edgewise radially outwardly extending elongated cutting fingers. Each of these cutting fingers is spaced from the adjacent cutting fingers in the sense that the vertical edges of individual cutting fingers diverge from each other from the bases of fingers radially outwardly to the free tip ends of the fingers, as best seen in Figure 4. On the other hand, the vertical faces of each individual cutting finger slightly converge in a radially outward direction. As viewed from the side, as for example in Figure 3, it will be seen that the upper and lower edges of the cutting fingers converge in a radially outward direction from a greatest height adjacent their bases to little or no height at their outer ends. The angle between these upper and lower edges is preferably about thirty degrees and is distributed about equally on either side of that central plane of the cutter disc which is perpendicular to the axis of rotation thereof, so that these upper and lower edges are disposed at equal but opposite angles of about fifteen degrees each to the horizontal as seen in Figure 3. It should also be noted that the planes of the upper and lower and side edges of each cutting tooth 21 intersect in edges which, at least on the leading side of the teeth with regard to the selected direction of rotation, are sharp cutting edges both on the upper side and on the lower side of each cutting tooth.

Although rotor 19 is disposed in housing 9, a plurality of teeth 21 extend outside housing 9 while a plurality of other teeth 21 are disposed inside housing 9 in all positions of rotor 19. Naturally, the same teeth do not remain outside or inside casing 9, but move alternately into and out of the casing as the rotor rotates. For example, if the rotor rotates clockwise as seen in Figure 4, the cutting teeth progressively and successively leave housing 9 through the lower end of the slot at the front of the housing, move in a circular path outside the housing and re-enter the housing through the upper portion of the slot as seen in Figure 4.

Also disposed in cavity 11 and secured to the disc of rotor 19 coaxially therewith is a driven bevel gear 23 which is in mesh with drive bevel gear 7. Thus, rotor 19 is power driven through this gear train from the electric motor.

Removably mounted on the forward end of the casing is a skin guard or comb 25 which is of resilient construction and may, for example, be made of sheet steel. Comb 25 comprises an upper casing portion 27 and a lower casing portion 29 interconnected by a plurality of spaced guard or comb teeth 31 which extend radially outwardly from the axis of shaft 17. Each comb tooth 31 comprises an upper leg 33 secured at one end to upper casing portion 27 and superposed in vertical alignment as seen in Figure 3 above a lower leg 35 secured at one end to the lower casing portion 29. Upper and lower legs 33 and 35 of each tooth 31 are joined together at their outermost ends and define between them substantially the same angle as the upper and lower edges of cutting teeth 21. As seen from above in Figure 4, those portions of cutting teeth 21 and upper and lower legs 33 and 35 which overlie each other have the same shape and size. As seen from the side in Figure 3, the inner surfaces of comb teeth 31 and the upper and lower cutting edges of cutting teeth 21 have the same angular relationship as each other and are contiguous to each other in sliding relationship. At least those edges of comb teeth 31 with which the cutting edges of cutting teeth 21 close upon rotation of rotor 19 are sharp cutting edges, so that as cutting teeth 21 pass between upper and lower legs 33 and 35 of comb teeth 31 upon rotation of rotor 19, there will be a scissors action continuously repeated along both the upper and lower cutting edges of each cutting tooth 21.

In order that comb 25 may be removed to permit cleaning or repair of the device, housing 9 is provided with an up-standing rounded ridge 37 disposed transversely of the axis of shaft 17, and upper casing portion 27 of comb 25 is provided with an upward projection 39 that extends over a portion of housing 9 and receives ridge 37 within a downwardly opening transverse groove 41. Lower casing portion 29 of comb 25 engages with the opposite or under side of housing 9, so that comb 25 is resiliently held in the assembled relationship shown in Figure 3 by a spring clip action. It can be snapped on or off as desired. In assembled relationship, lower casing portion 29 covers the head of shaft 17 so as to prevent undesired loosening or removal of shaft 17.

As seen in Figure 4, comb 25 thus provides in effect a circular continuation of housing 9; but the marginal edges of cavity 11 do not quite provide a circular continuation of comb 25. Instead, the marginal edges of cavity 11 are spaced progressively farther away from the ends of cutting teeth 21 toward the rear of housing 9, as indicated at 43. There is thus provided a space into which hair cuttings may be conveyed by the cutting teeth as they re-enter the housing without clogging between the cutting teeth and the side walls of cavity 11. A plurality of cleaning holes 45 extend through housing 9 adjacent this space to permit discharge of hair cuttings from the device; and the combination of these holes and the spacing at 43 assures a smooth and continuous discharge of hair cuttings without the need for frequent manual cleaning of the device.

The operation of the device is quite apparent. When the motor is turned on, the rotor is driven through the drive train and the device may be used to trim the hairline in any of a variety of positions of use, as it cuts on either side of the fan-shaped forward comb 25. For cleaning or replacement or sharpening of the parts, the comb snaps off, whereupon shaft 17 may be removed and the unitary assembly of the cutting discs and cutting teeth and driven bevel gear slipped out through the forward slot of the gear housing. Reassembly proceeds in the reverse manner.

From a consideration of the above disclosure, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A device for cutting hair, comprising a casing having a forwardly opening cavity therein, a rotor shaft extending through the casing on one side of the cavity and across the cavity and terminating in the casing on the other side of the cavity and having screw-threaded engagement with the casing, a rotor mounted in the cavity in the casing for rotation on the shaft and having a plurality of radially extending cutting teeth, some of the cutting teeth extending outside the casing and some of the cutting teeth being disposed inside the casing in all positions of the rotor, and a resiliently deformable integral comb having a plurality of stationary comb teeth disposed outside the casing and extending radially of the axis of the rotor, the cutting teeth which extend outside the casing successively registering with the stationary comb teeth upon rotation of the rotor thereby to cut hairs disposed between the cutting and comb teeth, the comb having opposed portions disposed on both sides of the cavity and resiliently gripping the casing between them removably to mount the comb on the casing, said portion of the comb on said one side of the cavity covering the end of the rotor shaft on said one side of the cavity.

2. A device for cutting hair, comprising a casing having a forwardly opening cavity therein, a flat rotor disc mounted for rotation in the cavity in the casing, the flat rotor disc having a plurality of edgewise radially outwardly extending elongated cutting fingers, some of the fingers extending outside the casing and some of the fingers being disposed inside the casing in all positions of the rotor, a comb mounted on the casing and having a plurality of stationary comb teeth disposed outside the casing, the cutting fingers which extend outside the casing successively registering with the stationary comb teeth upon rotation of the rotor disc thereby to cut hairs disposed between the cutting fingers and the comb teeth, the cutting fingers having clearance with the side walls of the cavity in the casing, said clearance progressively increasing rearwardly in the plane of the flat rotor disc, and the casing having at least one opening therethrough communicating between the rear of the cavity and the exterior of the casing for the discharge of hair cuttings conveyed by the cutting fingers to the region of increased clearance at the rear of the rotor disc.

References Cited in the file of this patent
UNITED STATES PATENTS

| | | |
|---|---|---|
| 1,501,737 | Allin | July 15, 1924 |
| 2,178,976 | Te Pas | Nov. 7, 1939 |

FOREIGN PATENTS

| | | |
|---|---|---|
| 4,775 | Great Britain | of 1889 |
| 654,359 | Great Britain | June 13, 1951 |